United States Patent
Kappmeyer

(10) Patent No.: US 8,946,585 B2
(45) Date of Patent: Feb. 3, 2015

(54) METHOD FOR THE MANUFACTURE OF A CUTTING TOOL

(75) Inventor: Gregor Kappmeyer, Bad Homburg (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1035 days.

(21) Appl. No.: 11/808,443

(22) Filed: Jun. 11, 2007

(65) Prior Publication Data

US 2007/0283786 A1  Dec. 13, 2007

(30) Foreign Application Priority Data

Jun. 9, 2006 (DE) .......................... 10 2006 026 967

(51) Int. Cl.
| | | |
|---|---|---|
| *B23K 26/00* | (2014.01) | |
| *B21K 21/00* | (2006.01) | |
| *B23K 26/34* | (2014.01) | |
| *B22F 3/105* | (2006.01) | |
| *B22F 5/10* | (2006.01) | |
| *B23B 27/00* | (2006.01) | |
| *B23B 27/10* | (2006.01) | |
| *B23B 29/12* | (2006.01) | |
| *B23C 5/28* | (2006.01) | |
| *B22F 3/24* | (2006.01) | |

(52) U.S. Cl.
CPC .............. *B23K 26/34* (2013.01); *B22F 3/1055* (2013.01); *B22F 5/10* (2013.01); *B23B 27/002* (2013.01); *B23B 27/10* (2013.01); *B23B 29/12* (2013.01); *B23C 5/28* (2013.01); *B22F 2003/248* (2013.01); *B22F 2998/10* (2013.01); *B23B 2250/12* (2013.01); *B23B 2250/16* (2013.01); *B23K 2201/20* (2013.01)
USPC ...... 219/121.6; 76/101.1; 76/108.6; 76/108.1

(58) Field of Classification Search
CPC ...... B22F 2998/10; B22F 3/1055; B22F 3/24; B22F 2003/248; B22F 5/10; B23B 2250/12; B23B 2250/16; B23B 27/002; B23B 27/10; B23B 29/12; B23C 5/28; B23K 2201/20; B23K 26/34
USPC ................. 76/101.1, 108.6, 108.1; 219/121.6
See application file for complete search history.

(56) References Cited

U.S. PATENT DOCUMENTS 4,786,111 A * 11/1988 Yargici ........................... 299/10
4,938,816 A    7/1990 Beaman et al.

(Continued)

FOREIGN PATENT DOCUMENTS

DE    30 04 166 A1    8/1980
DE    199 52 998 A1   5/2001

(Continued)

OTHER PUBLICATIONS

European Search Report dated Sep. 26, 2007 from counterpart European patent application.

*Primary Examiner* — Dana Ross
*Assistant Examiner* — Ket D Dang
(74) *Attorney, Agent, or Firm* — Timothy J. Klima; Shuttleworth & Ingersoll, PLC

(57) ABSTRACT

A method for the manufacture of a cutting tool provided with a tool holder (1) to which a cutter (2) is separably attached, includes applying a generative production process to a tool base body (3) to create the tool holder (1) with a desired finished shape.

9 Claims, 2 Drawing Sheets

(56) References Cited

U.S. PATENT DOCUMENTS

Figure 1:
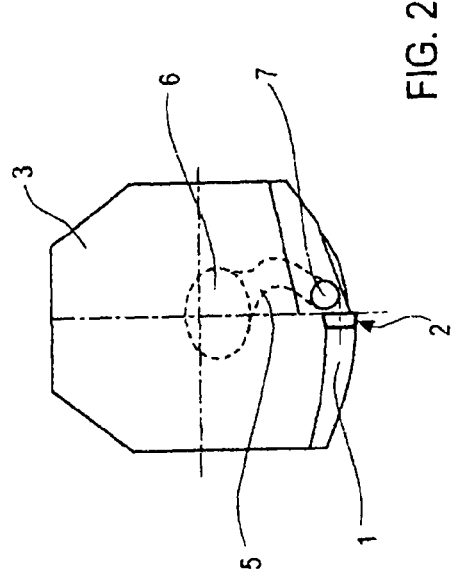

| | | |
|---|---|---|
| 5,233,150 A | 8/1993 | Schneebeli et al. |
| 6,158,304 A * | 12/2000 | Packer et al. ............... 76/104.1 |
| 6,209,420 B1 * | 4/2001 | Butcher et al. .............. 76/108.2 |
| 6,269,540 B1 * | 8/2001 | Islam et al. ................. 29/889.7 |
| 6,576,037 B1 | 6/2003 | Bonneau et al. |
| 6,860,172 B2 * | 3/2005 | Hecht ........................ 76/108.6 |
| 7,270,504 B2 * | 9/2007 | Tubinger et al. ............. 408/227 |
| 2002/0152002 A1 | 10/2002 | Lindemann |
| 2005/0038551 A1 * | 2/2005 | Mazumder et al. ........... 700/166 |
| 2005/0281677 A1 * | 12/2005 | James ........................ 416/244 A |

FOREIGN PATENT DOCUMENTS

| | | |
|---|---|---|
| DE | 100 39 143 C1 | 1/2002 |
| DE | 10 2004 032 093 A1 | 1/2006 |
| DE | 10 2004 042 878 A1 | 3/2006 |
| EP | 03 91 881 A2 | 10/1990 |
| EP | 1270123 | 1/2003 |

* cited by examiner

METHOD FOR THE MANUFACTURE OF A CUTTING TOOL

This application claims priority to German Patent Application DE 10 2006 026 967.5 filed Jun. 9, 2006, the entirety of which is incorporated by reference herein.

This invention relates to a method for the manufacture of a cutting tool.

Cutting tools, in particular special forms for the manufacture of complex workpieces, for example turbine components of aircraft engines, are frequently designed with a geometry that is specific to the manufacture of individual component areas, to enable machining to be economized where flanges and recesses are involved. Tool design is here intended to suitably move the tool cutting edge along the workpiece geometry while preventing the tool base body from colliding with the pre-machined or finish-machined areas of the workpiece.

The tools are mostly manufactured by a cutting method, with the tool holder being produced by cutting machining in several operations starting out from an oversized base body. Here, production of the complex tool geometry mostly comprises the processes turning, milling, drilling, grinding and thread production, followed by processes for the generation of special material properties, such as nitriding or hardening treatments. The area of the tool holder into which the cutter (mostly in the form of indexable inserts or parting bits) is inserted is normally ground.

The tool can consist of one or several parts, with the wear-prone, sword-shaped tool holders being frequently connected to the tool base body via a separate interface.

Known is a method for direct, laser-aided application of material for generative production of structures and components (Direct Metal Deposition, DMD). The method is used for the repair of tools, for example. Forging, injection molding and pressing tools are subject to severe wear and cracking. DMD enables damaged metal structures to be rebuilt. Upon definition of the wear condition and the area to be restored, the surface is machined down accordingly. Subsequently, new material can be applied. By pore and crack-free deposition of molten material, a high-strength bond with the base material as well as a completely tight material surface is produced. Material properties and loadability of the original tool are maintained.

For deposition, pure metal powder is sprayed, co-axially to the beam of a $CO_2$ laser, into the molten bath generated on the component surface using a powder nozzle and melted up completely. Up to four, variably equippable powder feeders can here be used in parallel. There is only minimum heat input into the workpiece. A sensor system with three CCD cameras is used for monitoring and controlling material deposition. Five-axis kinematics enables the processing of three-dimensional surfaces, for example by means of 3D CNC data.

Immediately upon subsequent spark erosion or re-machining, as applicable, the surface can be polished or etched. Even textured surfaces on the tool are repairable.

Another known method is Selective Laser Melting (SLM). It enables complex workpieces to be rapidly and efficiently produced.

Known are tools for the production of punches, dies and inserts for sheet metal forming tools, compression and injection molds. Also items of delicate metal and lightweight structures in metal oxides as well as components of medical implants are producible with accuracy of every detail.

Components or tool inserts are producible from almost all commercially available metal powders (e.g. zinc, bronze, tool steel, high-grade steel, titanium, cobalt, chrome). Even powders from the family of MCP alloys can be produced to melting cores, for example. The system yields components and tools with homogenous structure and a density of up to 100 percent, depending on the respective requirement. As a result of the short process chain, with no requirement for subsequent heat treatment or infiltration of the components, the process is time and cost saving. The process is characterized by a rapid and uncomplicated sequence of operations. Components with strong recesses or complex tool inserts provided with cooling ducts parallel to the surface (conformal cooling) to substantially reduce the cycle time in injection molding are realizable. Precise, detailed and dimensionally accurate build-up of the workpieces with a building rate of 5 $cm^3/h$ (average) is possible without thermal or mechanical distortion. It is a rapid and automatic process.

For the state of the art of the known processes reference is made to US 2005/0038551 A1 and US 2002/015 2002 A1.

The state of the art for mashining tool production has some substantial disadvantages inherent in the traditional form of manufacture. These are:

Long manufacturing and delivery times due to a multitude of manufacturing processes to be performed in sequence, Restricted arrangeability of the coolant-lubricant supply at the tool cutting edge, Limited dampability of the tools by local, externally arranged vibration dampers, Restricted arrangeability of signal or power leads within the tool, e.g. sensor line.

A broad aspect of the present invention is to provide a method of the type mentioned above, which enables the manufacture of cutting tools of complex geometries, while being simply structured and easily and cost-effectively applicable.

It is a particular object of the present invention to provide at least one solution to the above problems by the combination of the features described herein. Further advantageous embodiments of the present invention will become apparent from the description below.

In accordance with the present invention the following has been provided:

Manufacture of tool base bodies, tool holders or parts thereof by means of generative production processes, e.g. selective laser melting (SLM) or direct metal melting.

In the SLM process, paths for layer-wise generation of solid structures are generated on the basis of 3D geometry data of any geometry. For the generation of the component, a thin layer of metallic powder is applied using a scraper. The thickness of the layer depends on the powder grain size used, the material used and the laser source. Using a laser beam, the powder is locally molten up, thereby combining with the underlying solid material. Thus, powderous material can be solidified layer-wise and any geometry procuded on the basis of 3D geometry data. The process enables even complex geometries to be generatively produced in a single operation.

Facilities for the process to be applied are manufactured and marketed by Messrs Trumpf Laser and MCP Group, for example.

Material may be built up on an existing base body arranged such in the facility that the flat upper side is flush with the scraper plane. The base bodies according to the present invention are pre-fabricated tool holders provided, for example, with a coolant supply hole or a standardized machine interface. The method according to the present invention is used for the manufacture of complete tools, but in particular of those tool areas requiring complex geometry. Specifically, these are the areas of the tool holder requiring adaptation to the workpiece.

Almost any inner structure, for example flow-optimized internal coolant ducts, is thus producible, with a flow-optimized inlet and one or more coolant outlets being disposable in the immediate vicinity of the tool cutting edge.

In connection with the application of the method in accordance with the present invention, the following measures according to the present invention are also to be mentioned, these being applicable both individually or in combination:

Tool design according to the design principles of mechanics as applicable to stiffness optimization. Here, reinforcements of almost any complexity may be applied for optimization of the mechanical properties of the tool.

Moreover, the tools can be designed as hollow structures for weight reduction. Here, openings for the evacuation of the cavities are provided which are subsequently closed again, for example by a plug, as applicable.

The method according to the present invention provides a specific mechanism for dampening tool vibrations. In the process, closed, non-solidified cavities are produced which enclose the powderous material disposed during manufacture. If vibration is excited, e.g. by chatter of the tool cutting edge, this powderous material acts as damper, effectively reducing the vibration tendency of the tool. The position of these damper pockets is optimized by FEM calculation of the natural vibration modes of the tool. Ideally, these pockets are arranged and designed in areas with high amplitude and low influence on the strength of the tool.

The present invention is applicable to turning, milling and drilling tools.

The method in accordance with the present invention is characterized by a number of merits:

- Rapid, short process chain resulting in significant reduction of the manufacturing time as compared to traditional methods,
- Reduced design effort since tool geometry can be designed without consideration of the machining capabilities,
- Several tools are producible in one operation,
- Unrestricted geometrical design of the tool holder,
- Strength-optimized design of tool holders by optimized design capabilities,
- Free geometrical design of chip compartments,
- Any shape, even complex geometrical structure, of coolant-lubricant supply at the tool cutting edge providable without costly drilling processes,
- Flow-optimized shape of the inner coolant-lubricant supply ducts with steadily tapering cross-section,
- On milling tools, use of centrifugal force to increase the coolant-lubricant pressure by way of radially-spirally routed coolant-lubricant ducts with coolant-lubricant discharge immediately at the tool cutting edge,
- Possibility of internal branching of the coolant-lubricant ducts,
- Arrangement of internal dampening systems of any form within the tool structure,
- Repairability of the tools by partial regeneration and re-use of tool parts,
- Arrangeability of multiple tool cutting edges on one tool holder,
- Applicability of different materials in one tool, thus enabling the tool properties to be locally optimized in terms of wear, dampening characteristics and the like,
- Dampening of tool vibrations by internal cavities with metal powder filling,
- Material saving over traditional tool manufacture,
- Removal of tool parts and re-build by SLM using a processing program adapted to the new geometry to be generated,
- Production of tools or tool holders, as applicable, as a unit or in individual parts, with concurrent production of joining elements,
- Production of form-fitting, non-removable joining elements (bolts and threads) as well as articulation elements enabling articulated connection of tool parts without extra fasteners (swivelable coolant-lubricant supply nozzles),
- A method usable for restoration or rework, as applicable, of existing tools and tool parts for repair purposes (e.g. tool bit seats).

Figure 2:
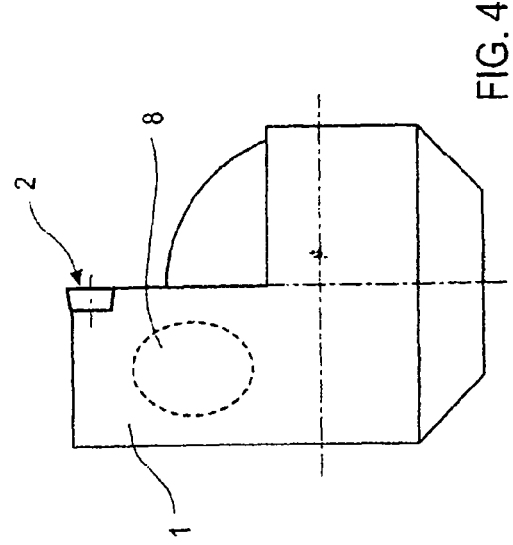
Figure 3:
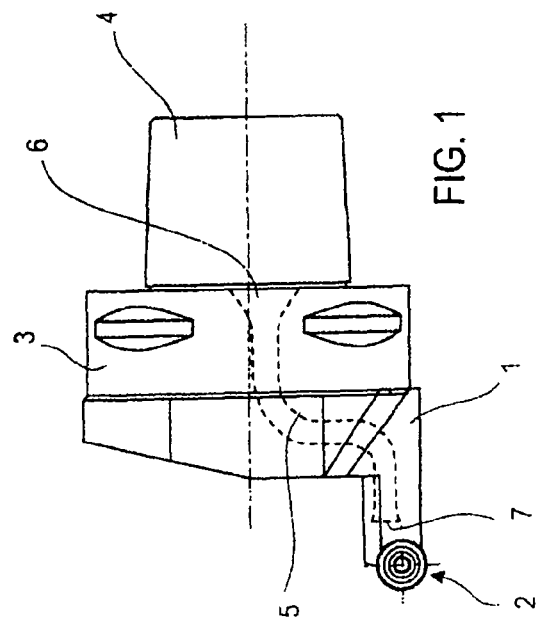
Figure 4:
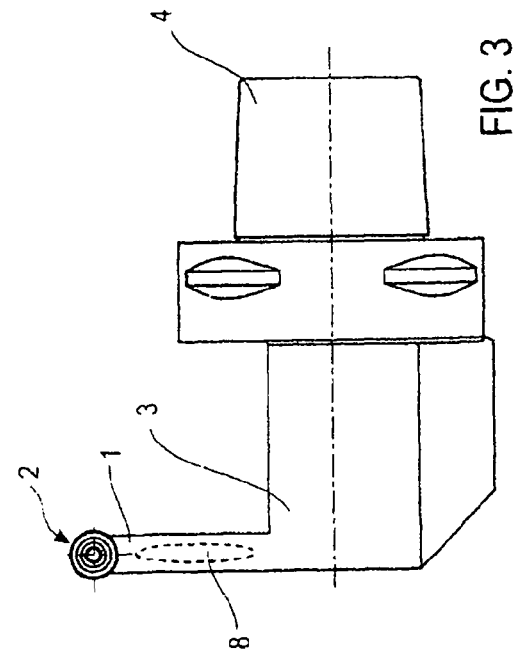
Figure 5:
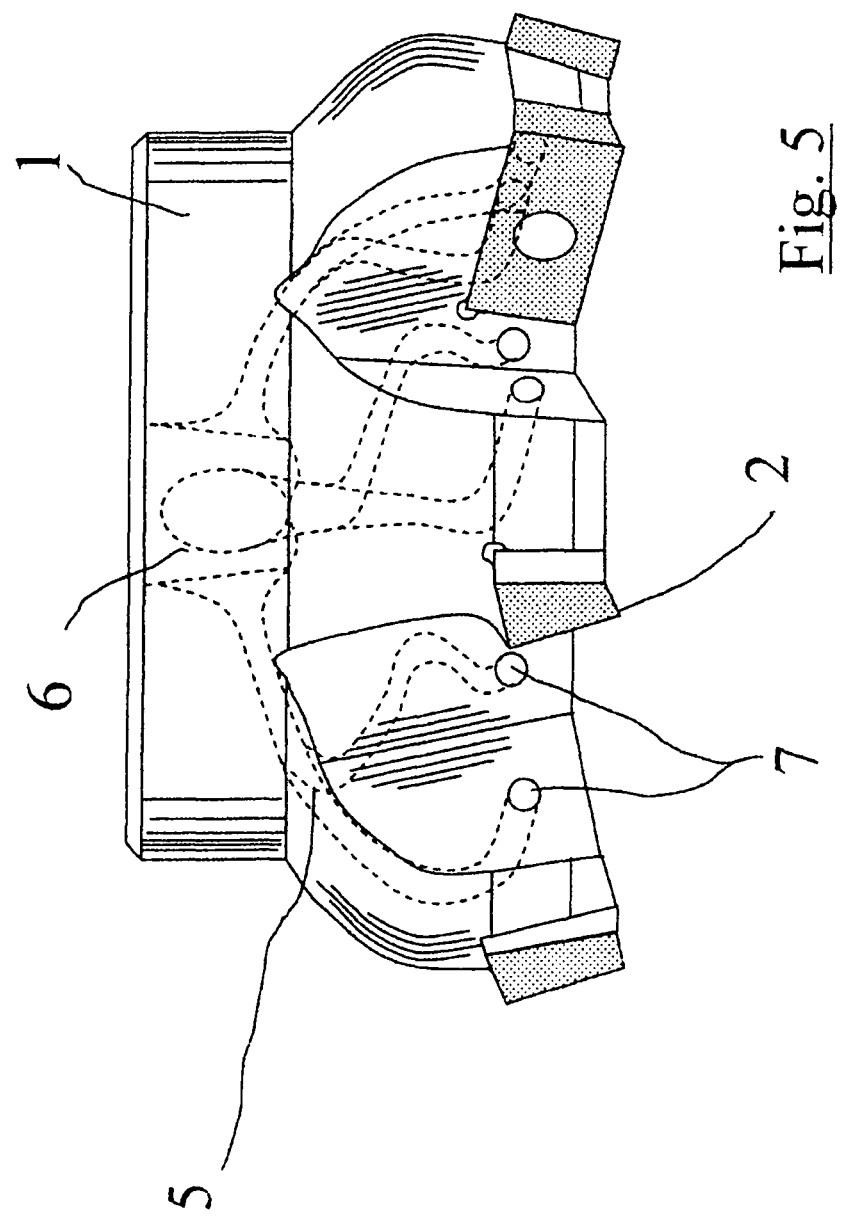

The invention is more fully described in light of the accompanying drawings showing preferred embodiments. In the drawings, FIG. 1 is a schematic lateral view of a first embodiment of a cutting tool in accordance with the present invention, FIG. 2 is a frontal view of the cutting tool shown in FIG. 1, FIG. 3 is a lateral view of a further embodiment of a cutting tool in accordance with the present invention, FIG. 4 is a lateral view of the cutting tool shown in FIG. 3, and FIG. 5 is a lateral view of a milling tool with branched, flow-optimized coolant ducts.

In the embodiments shown, identical parts are identified by the same reference numerals.

The tools comprise a standardized machine interface 4 which connects to a tool base body 3. The tool base body 3 forms one-piece with a tool holder 1 to which a cutter 2 (for example, an indexable insert) is separably attached.

FIGS. 1 to 5 show that the geometry of the tool holder 1, in particular, can be highly complex. This applies equally to the geometry of a coolant supply duct 5 that extends through the tool base body 3 and the tool holder 1 and is provided with an inlet 6 and an outlet 7. The Figures illustrate that highly complex forms of coolant supply ducts 5 are possible. See FIG. 5 especially. These are produced by not melting powderous material positioned in the desired coolant supply duct path and subsequently removing such non-melted powderous material to form the coolant supply ducts.

In the example in FIGS. 3 and 4, a cavity 8 is provided for dampening tool vibration. It is at least partially filled with non-solidified (non-melted) powderous material that was encapsulated either during the cavity creation process, or subsequently, and which non-solidified powderous material has a dampening effect under vibration excitation.

The tool holder can be further processed after the generative production process including processing by a machining process and/or an erosive machining process (e.g., electrochemical machining or wire erosion). The tool base body can also be subsequently heat treated.

LIST OF REFERENCE NUMERALS

1 Tool holder
2 Cutter
3 Tool base body
4 Machine interface
5 Coolant supply duct
6 Inlet
7 Outlet
8 Cavity

What is claimed is:

1. A method for manufacturing a cutting tool having a tool holder to which a cutter is separably attached, comprising:

providing a metal base body having a configuration different than a final cutting tool configuration;

forming successive layers of metal onto the metal base body, comprising:

applying a layer of metallic powder on the metal base body;

melting a portion of the metallic powder in a specified pattern to combine the melted metallic powder with an underlying material;

repeating the steps of applying and melting a portion of the metallic powder in a specified pattern for each layer to combine the melted metallic powder with the underlying layer, until the successive applied layers form a preliminary shape of the cutting tool;

wherein one of the successive applied layers is formed to include a melted metallic powder portion forming a solidified lower boundary portion;

wherein further ones of the successive applied layers are formed over the one of the successive layers in patterns to create a melted metallic powder portion forming a solidified side boundary surrounding a non-solidified metallic powder portion, with:

the non-solidified metallic powder portion being supported by the solidified lower boundary portion; and the further ones of the successive applied layers extending a height of the side boundary and quantity of the non-solidified metallic powder portion surrounded by the side boundary removing metal from the applied layers to finish the tool holder to the final cutting tool configuration;

enclosing the side boundary with a solidified upper boundary by melting a portion of the metallic powder of a vet further one of the success applied layers onto the side boundary to create a closed boundary formed by the lower boundary, side boundary and upper boundary, the closed boundary permanently encapsulating within the closed boundary the non-solidified metallic powder portion applied with the further ones of the successive applied layers and surrounded by the side boundary such that the closed boundary is at least partly filled with the non-solidified metallic powder which remains non-solidified upon completion of the cutting tool to act as a dampener.

2. The method in accordance with claim 1, wherein the removing metal step includes using at least one chosen from mechanical machining, electrochemical machining and electrical erosion machining.

3. The method in accordance with claim 2, and further comprising: subsequently applying a heat treatment to the tool base body.

4. The method in accordance with claim 3, wherein the tool base body includes a machine interface for connecting the cutting tool to a machine.

5. The method in accordance with claim 4, and further comprising creating a plurality of cavities, wherein at least one of the plurality of cavities is at least one chosen from a continuous coolant supply duct and a branched coolant supply duct.

6. The method in accordance with claim 1, wherein the melting is performed by direct metal melting.

7. The method in accordance with claim 1, and further comprising creating a plurality of cavities, wherein at least one of the plurality of cavities is for carrying at least one chosen from signal and power leads.

8. The method in accordance with claim 1, and further comprising: subsequently applying a heat treatment to the tool base body.

9. The method in accordance with claim 1, wherein the tool base body includes a machine interface for connecting the cutting tool to a machine.

* * * * *